(12) United States Patent
Hyun et al.

(10) Patent No.: US 9,199,623 B2
(45) Date of Patent: Dec. 1, 2015

(54) MOTOR DRIVEN BRAKE SYSTEM

(71) Applicant: Hyundai Motor Company, Seoul (KR)

(72) Inventors: Dong Yoon Hyun, Seoul (KR); Jong Yoon Jeong, Suwon (KR); In Su Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 13/967,625

(22) Filed: Aug. 15, 2013

(65) Prior Publication Data

US 2014/0188361 A1    Jul. 3, 2014

(30) Foreign Application Priority Data

Dec. 28, 2012  (KR) .......................... 10-2012-0156060

(51) Int. Cl.
| | |
|---|---|
| *B60T 8/88* | (2006.01) |
| *B60T 8/17* | (2006.01) |
| *B60T 13/74* | (2006.01) |
| *F16D 65/18* | (2006.01) |
| *F16D 121/24* | (2012.01) |
| *F16D 125/40* | (2012.01) |
| *F16D 127/06* | (2012.01) |
| *F16D 129/10* | (2012.01) |

(52) U.S. Cl.
CPC ................ *B60T 13/741* (2013.01); *B60T 8/17* (2013.01); *B60T 8/885* (2013.01); *F16D 65/18* (2013.01); *B60T 2270/414* (2013.01); *F16D 2121/24* (2013.01); *F16D 2125/40* (2013.01); *F16D 2127/06* (2013.01); *F16D 2129/10* (2013.01)

(58) Field of Classification Search
CPC ....... F16D 65/18; F16D 2129/10; B60T 8/17; B60T 8/885; B60L 11/14
USPC .......................................................... 701/70
See application file for complete search history.

(56) References Cited

U.S. PATENT DOCUMENTS 8,159,169 B2 *  4/2012  Watanabe et al. ............. 318/432

FOREIGN PATENT DOCUMENTS

| JP | 05-321961 | 12/1993 |
|---|---|---|
| JP | 2001146932 A | 5/2001 |
| JP | 2007321862 A | 12/2007 |
| JP | 2009103167 A | 5/2009 |

* cited by examiner

*Primary Examiner* — Nga X Nguyen
(74) *Attorney, Agent, or Firm* — Mintz Levin Cohn Ferris Glovsky and Popeo, P.C.; Peter F. Corless

(57) ABSTRACT

A motor driven brake system including a parking brake, in particular, a motor driven parking brake system in which a parking brake is implemented using a compact motor and a plurality of disks and friction pads mutually fractionized or released by the compact motor, so that it is possible to reduce operating noise of a solenoid as compared with that of an existing solenoid and to prevent a phenomenon that although a power failure of the compact motor occurs during driving, the braking power of the motor driven brake system is not released.

12 Claims, 8 Drawing Sheets

MOTOR DRIVEN BRAKE SYSTEM

CROSS-REFERENCE TO RELATED APPLICATION

This application claims under 35 U.S.C. §119(a) the benefit of Korean Patent Application No. 10-2012-0156060 filed Dec. 28, 2012, the entire contents of which are incorporated herein by reference.

BACKGROUND (a) Technical Field

The present invention relates to a motor driven brake system. More particularly, the present invention relates to a motor driven brake system including a parking brake.

(b) Background Art

A motor driven brake system refers to a next-generation brake system which is able to provide a faster and more precise braking response performance as compared with an existing hydraulic brake system, a more simplified package layout due to removal of hydraulic pipe lines, minimal environment pollution without using brake oil, simple development of efficient application logic, improved collision safety due to removal of a master cylinder and a vacuum booster, and the like.

In a motor driven brake system a brake pad is pressed by converting rotary power transmitted from a motor and a decelerator into linear power using a screw like mechanism. As a result, the motor driven parking brake system obtains braking power. On the contrary, when power is off, the screw like mechanism is unscrewed in the reverse direction by the pressing force of the brake pad, so that the braking power is released.

Because of these features of the motor driven brake system, a separate parking brake apparatus may be combined with the motor driven brake system so that parking braking power can be provided when the power is off. That is, since a separate parking brake in the existing hydraulic brake system more expensive and heavy, a separate parking brake apparatus configured to share motor power for braking with the motor driven brake system may be mounted to the motor driven brake system in an effort to solve these problems.

Hereinafter, the configuration and operation of a conventional motor driven brake system having a parking brake will be described with reference to FIGS. 1 and 2.

In FIGS. 1 and 2, reference numeral 100 represents a motor driven brake system, and reference numeral 200 represents a parking brake. The motor driven brake system 100 includes friction pads 104 attached in a caliper housing 102, and a disk 106 disposed between the friction pads 104 so as to be pressed by the friction pads 104. A piston 108 movable forward and backward is installed in a horizontal through aperture of a caliper housing 102, and a pressure member 110 having a screw aperture is integrally installed inside the piston 108.

In this case, a reduction gear and an electric motor 114 having both side shafts are mounted at an inner end portion of the caliper housing 102. Here, an outside shaft of the electric motor 114 is connected by means of the reduction gear to a screw-shaped push rod 116 inserted and fastened into the screw aperture 112 of the pressure member 110, and an inside shaft is employed as a rotating shaft 120 having a locking pin 118 formed on the outer circumferential surface thereof.

Meanwhile, as one configuration of the parking brake 200, a parking brake housing 202 is integrally mounted to an inner surface of the electric motor 114, and the rotating shaft 120 of the electric motor 114 is rotatably disposed at a central portion of the parking brake housing 202.

A solenoid 204 is mounted on the inner surface of the parking brake housing 202, and a horizontal pipe 206 is disposed between the solenoid 204 and the rotating shaft 120. A sliding disk 208 in the shape of a vertical plate is integrally formed with the inner end portion of the horizontal pipe 206. In this case, as shown in the sectional view taken along line D-D of FIG. 2, a locking groove 212 into which the locking pin 118 of the rotating shaft 120 is inserted is formed in the inside diameter surface of the horizontal pipe 206.

A spring 210 is disposed between the solenoid 204 and the sliding disk 208 to be compressible and expendable. A friction plate 214 that the sliding disk 208 frictionally contacts to perform parking braking is attached to the inner wall surface of the parking brake housing 202.

A controller 220 for turning on/off the power supplied to the device is connected to the electric motor 114 and the solenoid 204. Thus, during normal braking, the controller 220 turns on the electric motor 114 and simultaneously turns on the solenoid according to a degree to which a brake pedal is pushed.

Subsequently, when the push rod 116 of the electric motor 114 performs a standing rotation, the pressure member 110 fastened to the push rod 116 performs a rectilinear motion toward a vehicle outer direction. This is because the push rod 116 is formed in a screw like shape.

Continuously, the piston 108 integrally formed with the pressure member 110 presses the friction pads 104, and simultaneously, the disk 106 interposed between the friction pads 104 is pressed, so that braking is performed during driving. In this case, as power is applied to the solenoid 204, the parking brake is released.

That is, when the solenoid 204 is turned on, the solenoid 204 pulls the sliding disk 208 by means of the force from an electromagnet. In this case, the sliding disk 208 is spaced apart from the friction plate 214, so that the parking brake is released the rotating shaft 120 of the electric motor 114 becomes rotatable. Simultaneously, the spring 210 disposed between the solenoid 204 and the sliding disk 208 is compressed.

Accordingly, the forward/reverse rotation of the push rod 116 on the same axle with the rotating shaft 120 of the electric motor 114 is restricted, so that the braking operation of the motor driven brake system during driving can be smoothly performed together with the releasing of the parking brake.

On the other hand, when power to the solenoid 204 is turned off after the motor driven brake system is operated, the sliding disk 208 is adhered closely to the friction plate 214 while being slid by the resilience of the spring 210, so that the rotation of the rotating shaft 120 of the electric motor 114 is restricted, thereby operating the parking brake.

That is, the locking pin 118 formed on the rotating shaft 120 of the electric motor 114 is stuck in the locking groove 212 in the horizontal pipe 206 integrally formed with the sliding disk 208 in the state in which the sliding disk 208 is adhered closely to the friction plate 214, so that the rotating shaft 120 of the electric motor 114 is not rotated, thereby operating the parking brake. Accordingly, the reverse rotation of the push rod 116 on the same axle with the rotating shaft 120 of the electric motor 114 is restricted, so that the braking power of the parking brake is maintained.

However, in the conventional motor driven brake system having the parking brake, the operating noise of the solenoid is increased during operation and releasing of the parking brake. Although the braking power should be released for the purpose of safety when the supply of power to the solenoid is stopped while driving, the braking power cannot be released once a power failure occurs. Therefore, the vehicle may lose control, possibly causing a fatal accident.

In other words, when power is not supplied to the solenoid due to an error or failure in the controller when the motor driven brake system is operated during driving of the vehicle when the parking brake is released, i.e., when the power is applied to the solenoid to be turned on, the parking brake is operated as described above, and therefore, the braking power of the motor driven brake system may not be released. Accordingly, the vehicle may lose control thereby causing an accident.

SUMMARY OF THE DISCLOSURE

The present invention provides a motor driven brake system in which a parking brake is implemented using a compact motor and a plurality of disks and friction pads mutually fractionized or released by the compact motor, so that it is possible to reduce operating noise of a solenoid as compared with that of an existing solenoid and to prevent a phenomenon that although a power failure of the compact motor occurs during driving, the braking power of the motor driven brake system is not released.

In one aspect, the present invention provides a motor driven brake system including an electric motor for providing braking power, a push rod that is a shaft in the outer direction of the electric motor, a rotating shaft that is a shaft in the inner direction of the electric motor, and a parking brake housing mounted within the housing where an electric motor or electric motor with a reduction gear is mounted. More specifically, this system including: sliding disks and friction pads, alternately mounted between the outside diameter of the rotating shaft and the inside diameter of the parking brake housing to restrict or release the rotation of the rotating shaft; a pressure member disposed adjacent to the outermost sliding disk to press the sliding disks and the friction pads, and having a screw aperture formed in an outer surface thereof; a compact motor mounted to an outside inner wall surface of the parking brake housing so as to be operated by receiving power supplied only in the braking of a parking brake and the releasing of the braking of the parking brake; and a screw-shaped push rod, as a driving shaft of the compact motor, inserted into the screw aperture of the pressure member so as to perform a standing rotation for the purposed of the forward-and-backward movement of the pressure member.

In an exemplary embodiment, a guide member guiding a rectilinear movement of the pressure member while surrounding the outside diameter surface of the pressure member may be mounted to the inside diameter surface of the parking brake housing.

In another exemplary embodiment, a fixing disk providing bearing power when the sliding disks and the friction pads are pressed may be mounted between the inner surface of the electric motor and the innermost friction pad.

In still another exemplary embodiment, a first projection may be formed on the inside diameter surface of the parking brake housing, and a first recessed groove having the first projection inserted and fastened thereinto may be formed in the outside diameter surface of the friction pad.

In yet another exemplary embodiment, a second projection may be formed on the inside diameter surface of the sliding disk, and a second recessed groove having the second projection inserted and fastened thereinto may be formed in the outside diameter surface of the rotating shaft.

In still yet another exemplary embodiment, a third projection may be formed on the inside diameter surface of the guide member, and a third recessed groove having the third projection inserted and fastened thereinto may be formed in the outside diameter surface of the pressure member.

Advantageously, since power for the parking brake while driving is not required like in the existing solenoid-type parking brake, it is possible to reduce power consumption and to considerably decrease the operating noise of the solenoid.

Second, the existing solenoid-type parking brake has a disadvantage in that when a power failure of the solenoid occurs when the braking of the motor driven brake system is performed while driving, the vehicle loses control due to the phenomenon that the operating of the parking brake and the braking of the motor driven brake system is not performed because the solenoid does not turn off. However, in the present invention, it is unnecessary to supply power to the parking brake while driving, so that it is possible to prevent the brake from not releasing and to prevent any loss of control of the vehicle.

Third, a multi-stage disk and a friction pad, including a compact motor, are used to prevent the unlocking of a motor for operating the motor driven brake system when the parking brake is operated, so that it is possible to reduce the weight and cost of the entire brake system.

Fourth, although a failure of the parking brake occurs, the braking of the motor driven brake system and the releasing of the braking of the motor driven brake system are possible, thereby improving safety.

The above and other features of the invention are discussed infra.

BRIEF DESCRIPTION OF THE DRAWINGS

The above and other features of present invention will now be described in detail with reference to certain exemplary embodiments thereof illustrated the accompanying drawings which are given hereinbelow by way of illustration only, and thus are not limitative of the present invention, and wherein:

FIGS. 1 and 2 are sectional views illustrating a conventional motor driven brake system, in which FIG. 1 shows a braking state and FIG. 2 shows a brake releasing state;

FIGS. 3 and 4 are sectional views illustrating a motor driven brake system according to an embodiment of the present invention, in which FIG. 3 shows a braking state and FIG. 4 shows a brake released state;

Figure 1:
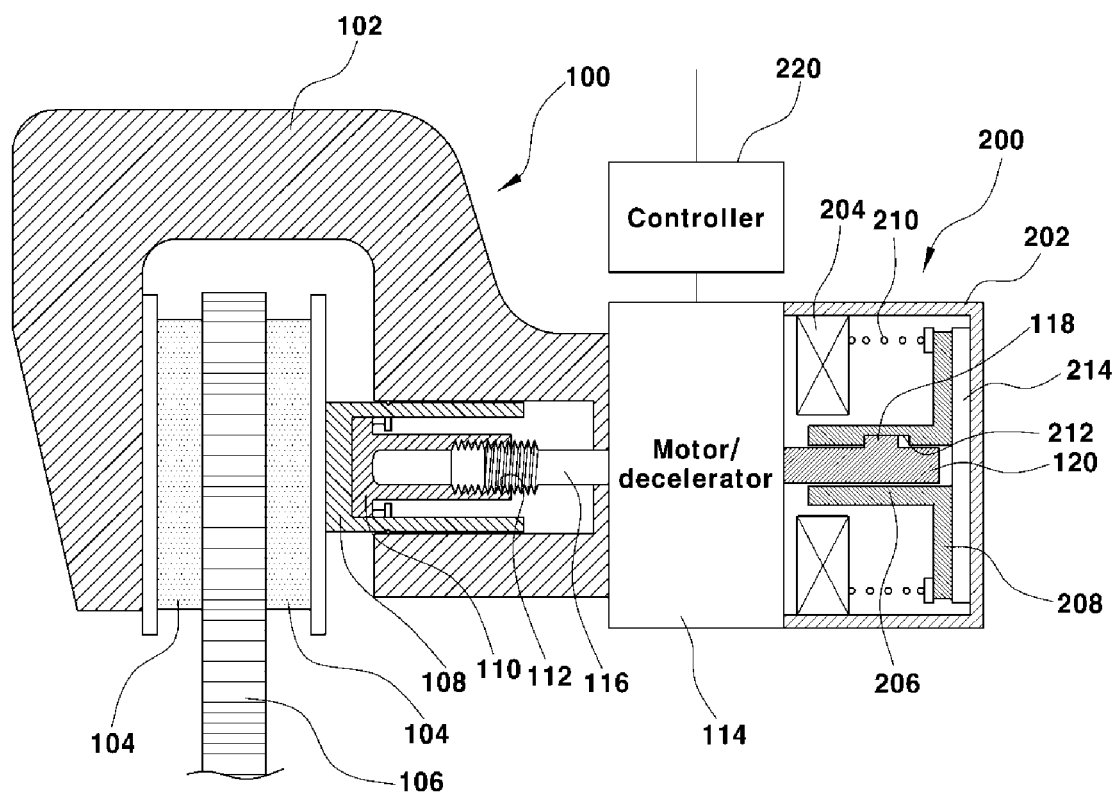
Figure 2:
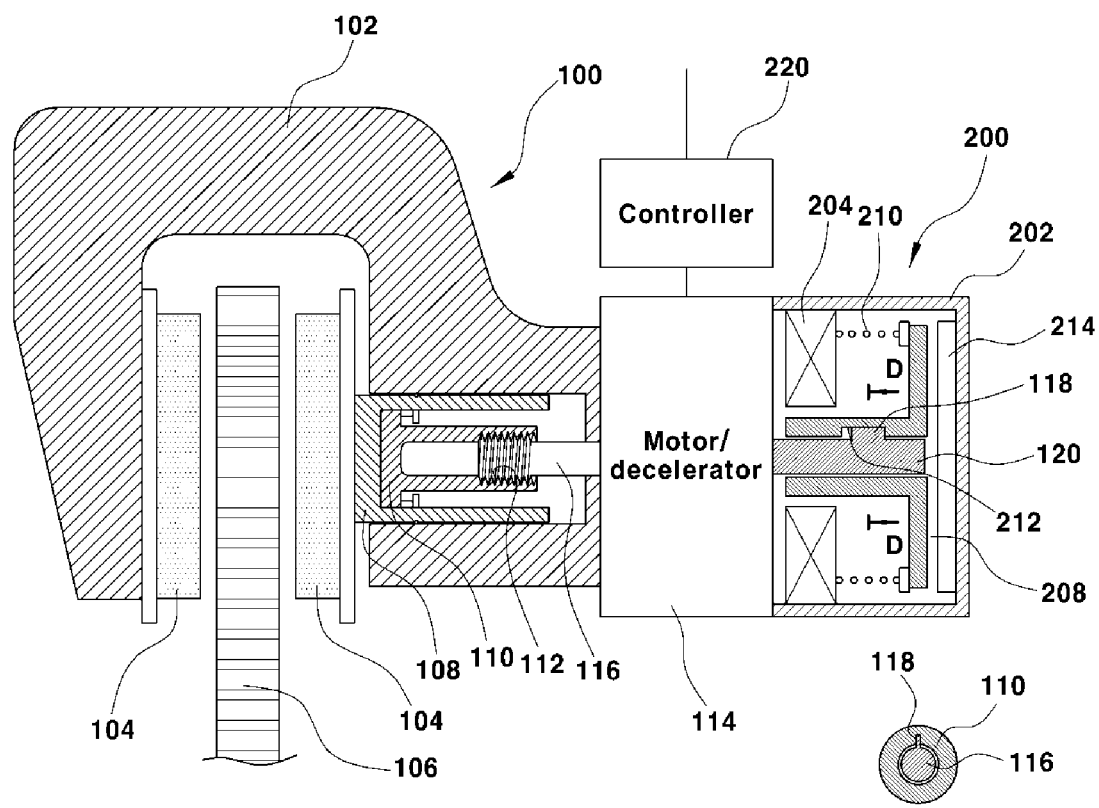

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the below methods are executed by at least one controller. The term controller refers to a hardware device that includes a memory and a processor. The memory is configured to store the instructions and the processor is specifically configured to execute said instructions to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics sever or a Controller Area Network (CAN).

Figure 3:
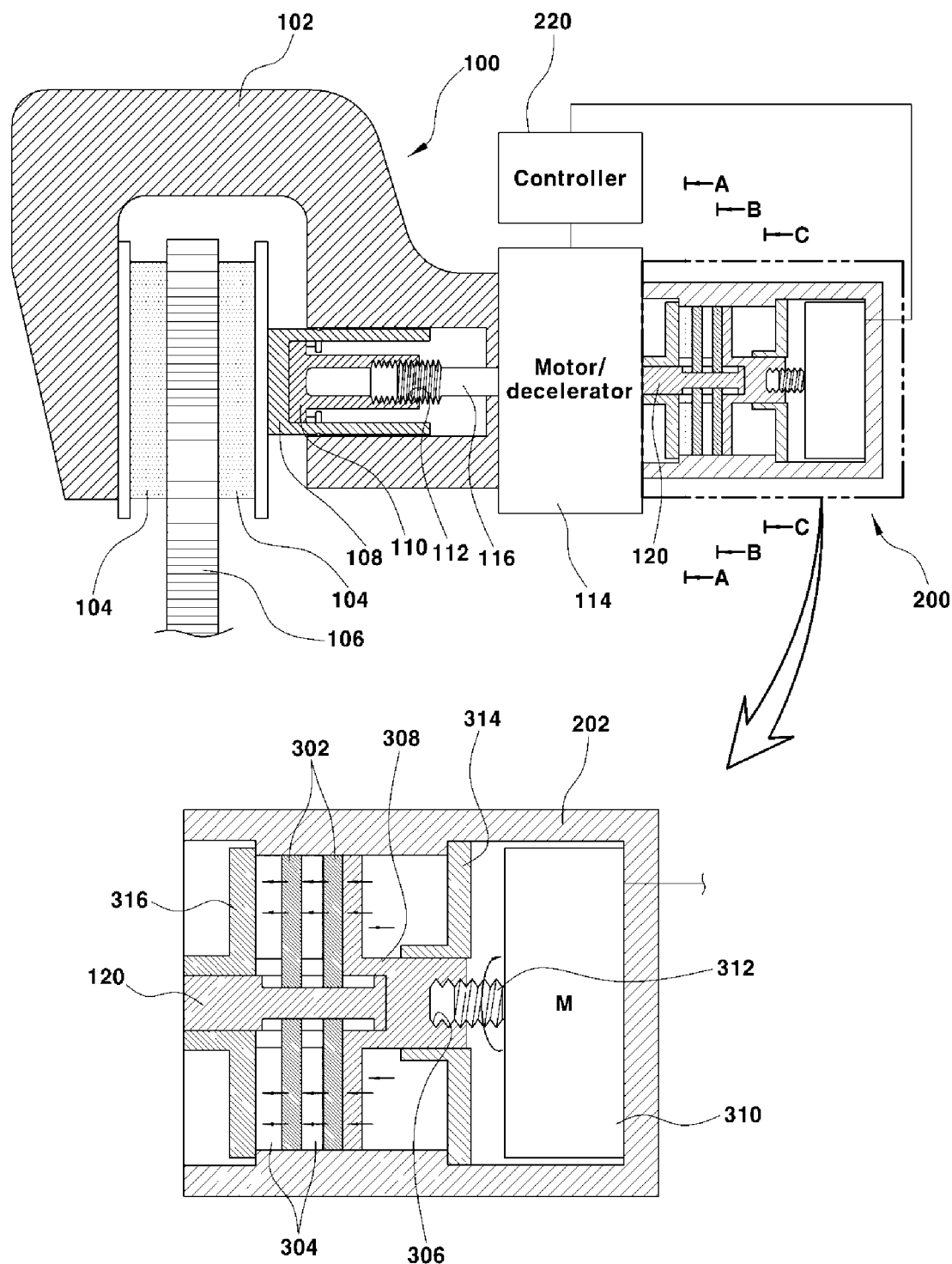
Figure 4:
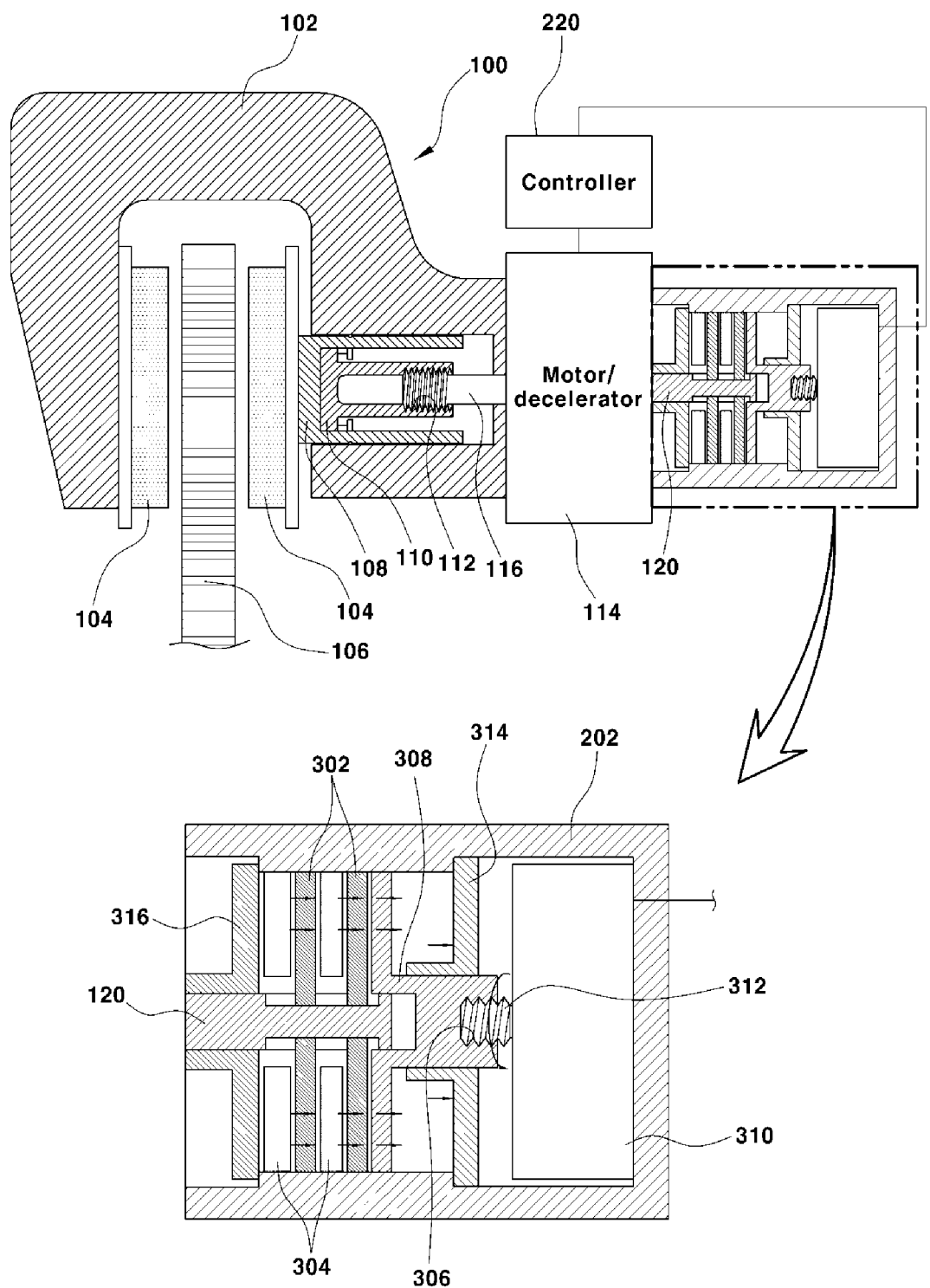

FIGS. 3 and 4 are sectional views illustrating a motor driven brake system including a parking brake according to an exemplary embodiment of the present invention. In FIGS. 3 and 4, reference numeral 100 represents a motor driven brake system, and reference numeral 200 represents a parking brake.

The motor driven brake system 100 basically includes friction pads 104 attached in a caliper housing 102, and a disk 106 disposed between the friction pads 104 so as to be pressed by the friction pads 104 when the brakes are applied.

A piston 108 movable forward and backward is installed in a horizontal through aperture of a caliper housing 102, and a pressure member 110 having a screw aperture is integrally installed inside the piston 108.

In this case, a reduction gear and an electric motor 114 having both side shafts are mounted at an inner end portion of the caliper housing 102. Here, an outside shaft of the electric motor 114 is connected by means of the reduction gear to a screw-shaped push rod 116 inserted and fastened into the screw aperture 112 of the pressure member 110, and an inside shaft on the same axle with the outside shaft is employed as a rotating shaft 120.

Meanwhile, as one configuration of the parking brake 200, a parking brake housing 202 is integrally mounted to an inner surface of the electric motor 114, and the rotating shaft 120 of the electric motor 114 is rotatably disposed at a central portion of the parking brake housing 202.

Here, a plurality of sliding disks 302 and a plurality of friction pads 304 are alternately stacked and arranged between the outside diameter of the rotating shaft 120 and the inside diameter of the parking brake housing 202. Here, the sliding disks 302 and the friction pads 304 restrict the rotation of the rotating shaft 120 to perform the braking of the parking brake or release the restriction of the rotation of the rotating shaft to release the braking of the parking brake. In this case, a fixing disk 316 is mounted between the inner surface of the electric motor 114 and the innermost friction pad 304. Here, the fixing disk 316 serves as a support plate when the sliding disks 302 and the friction pads 304 are pressed.

A pressure member 308 moving forward and backward as a means for pressing the sliding disks 302 and friction pads 304 is disposed adjacent to the outermost sliding disk. Thus, a screw aperture 306 for connecting the pressure member 308 to a compact motor 310 is formed in the outer surface of the pressure member 308.

Particularly, the compact motor 310 as a driving source allowing the pressure member 308 to move forward and backward so as to press the sliding disks 302 and the friction pads 304 is mounted to the outside inner wall surface. Thus, the compact motor 310 is maintained in a power-off state at normal times, and is driven by receiving power supplied only in the braking and releasing of the parking brake.

To this end, a screw-shaped push rod 312 that is a driving shaft of the compact motor 310 is inserted and fastened into the screw aperture 306 of the pressure member 308 so as to perform a standing rotation. The push rod 312 allows the pressure member 308 to move forward and backward.

A guide member 314 is mounted to the inside diameter surface of the parking brake housing 202. The guide member 314 guides the rectilinear movement of the pressure member 308 while surrounding the outside diameter surface of a horizontal pipe of the pressure member 308.

Figure 5:
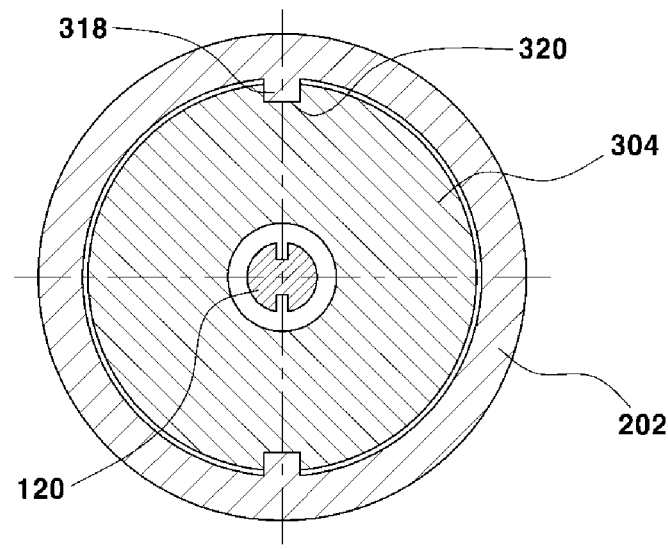
FIG. 5 is a sectional view taken along line A-A of FIG. 3.

In order to restrict the rotation of the friction pad 304, as shown in FIG. 5, a first projection 318 is formed on the inside diameter surface of the parking brake hosing 202, and a first recessed groove 320 is formed in the outside diameter surface of the friction pad 304.

Thus, the first projection 318 is inserted and fastened into the first recessed groove 320, so that the friction pad 304 is fixed to the inside diameter surface of the parking brake housing 202, and simultaneously, the inside diameter surface of the friction pad 304 is spaced apart from the rotating shaft 120.

Figure 6:
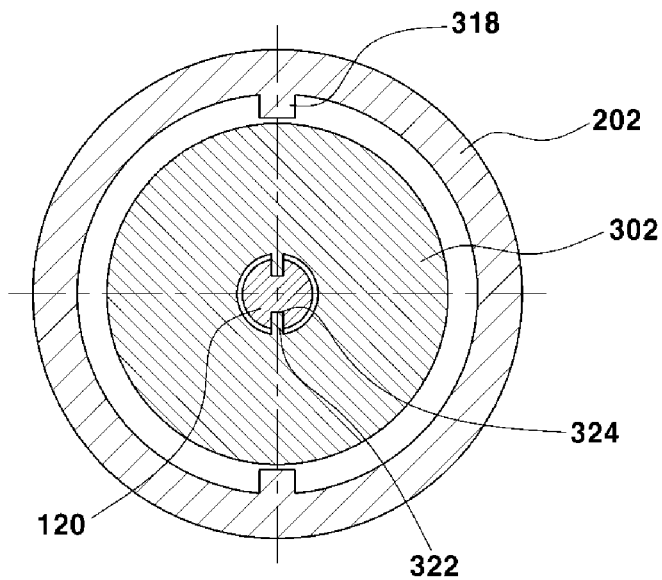
FIG. 6 is a sectional view taken along line B-B of FIG. 3.

In order to rotate the sliding disk 302 together with the rotating shaft 120, as shown in FIG. 6, a second projection 322 is formed on the inside diameter surface of the sliding disk 302, and a second recessed groove 324 is formed in the outside diameter surface of the rotating shaft 120.

Thus, the second projection 322 is inserted and fastened into the second recessed groove 324, so that the sliding disk 302 is fixed to the outside diameter surface of the rotating shaft 120, and simultaneously, the outside diameter surface of the sliding disk 302 is spaced apart from the inside diameter surface of the parking brake housing 202.

Figure 7:
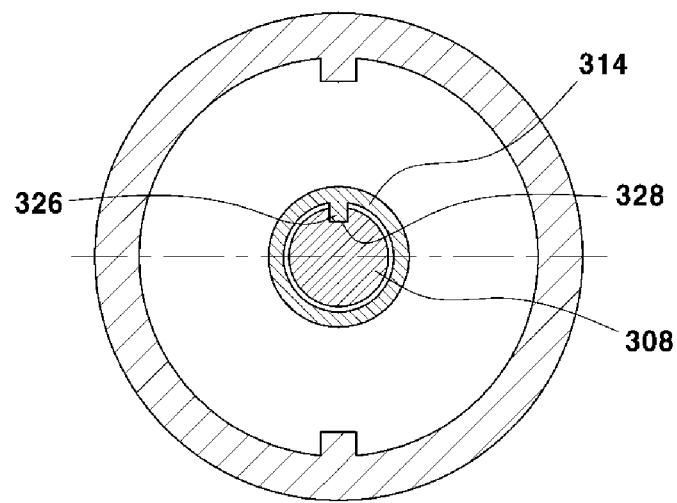
FIG. 7 is a sectional view taken along line C-C of FIG. 3.

In order to ensure the rectilinear movement of the pressure member 308, as shown in FIG. 7, a third projection 326 is formed on the inside diameter surface of the guide member 314, and a third recessed groove 328 having the third projection 326 inserted and fastened thereinto is formed in the outside diameter surface of the pressure member 308. Thus, when the pressure member 308 performs a forward-and-backward rectilinear movement, the third projection 326 of the guide member 314 is inserted into the third recessed groove 328, thereby guiding the rectilinear movement of the pressure member 308. Accordingly, it is possible to ensure the forward-and-backward rectilinear movement of the pressure member 308.

Hereinafter, the operation of the motor driven brake system configured as described above will be described as follows.

Operation (Braking) of Parking Brake

Figure 8:
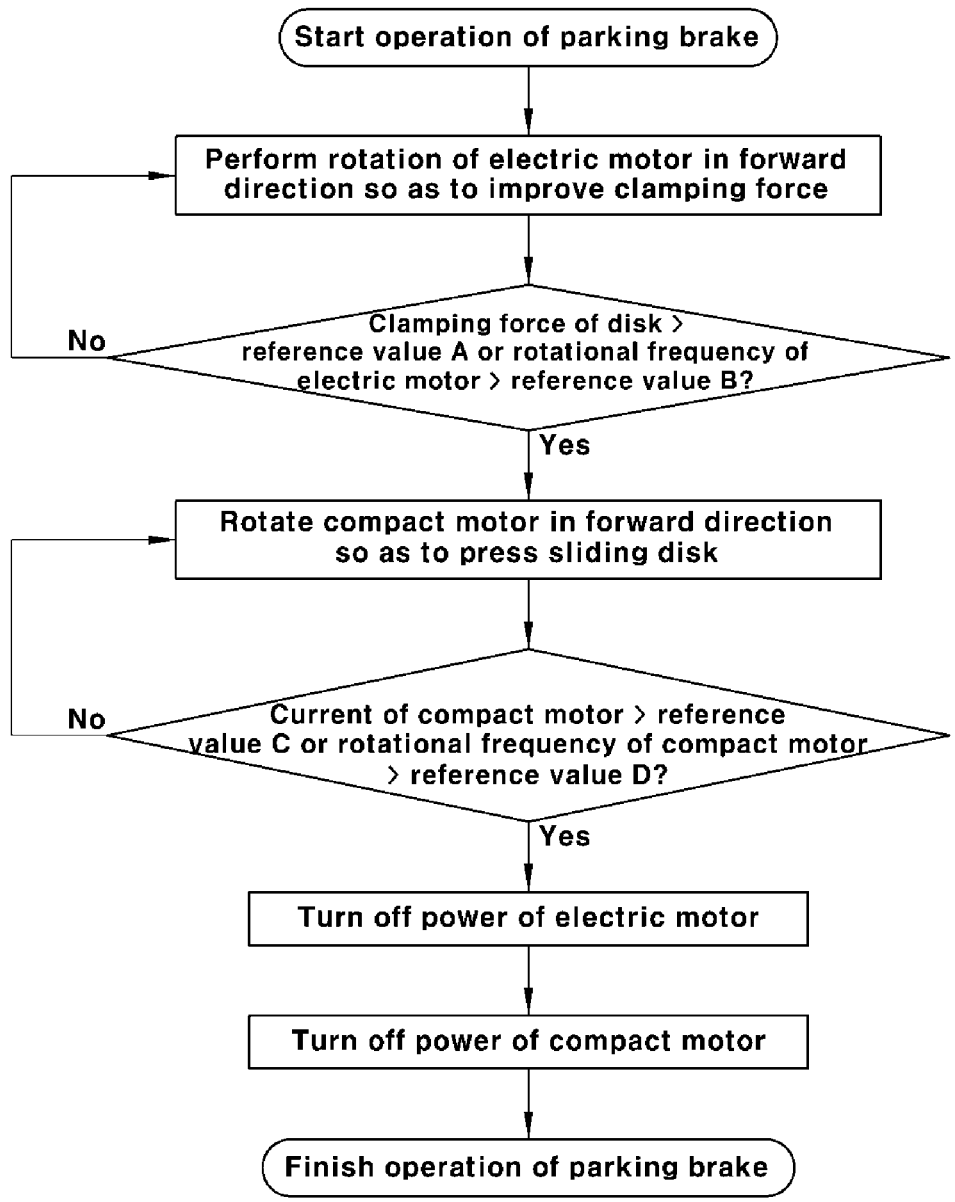
FIGS. 8 and 9 are flowcharts illustrating an operation of the motor driven brake system according to the embodiment of the present invention.

FIG. 3 is a section view illustrating an operating state of the parking brake of the motor driven brake system according to the embodiment of the present invention. FIG. 8 is a flowchart illustrating an operation of the motor driven brake system.

When the push rod 116 of the electric motor 114 performs a standing rotation in the forward direction by applying power from the controller 220 to the electric motor 114 of the motor driven brake system 100, the pressure member 110 fastened to the push rod 116 performs a rectilinear movement toward a vehicle outer direction. This is because the push rod 116 is formed in a screw shape.

Continuously, the piston 108 integrally formed with the pressure member 110 presses the friction pads 104, and simultaneously, the disk 106 interposed between the friction pads 104 is pressed, so that braking of the vehicle is performed.

When the clamping force of the friction pad 104 with respect to the disk 106 is greater than a reference value A or when the rotational angle of the electric motor 114 is greater than a reference value B, the controller 220 applies power to the compact motor 310. Accordingly, when the push rod 312 of the compact motor 310 performs a standing rotation in the forward direction, the pressure member 308 fastened to the push rod 312 moves forward. This is because the push rod 312 is also formed in the screw shape.

Continuously, as the pressure member 308 moves forward, the sliding disk 302 and the friction pad 304 are adhered closely to each other, so that the rotating shaft 120 of the electric motor 114 is restricted so as not to be rotated any more.

When the current applied from the controller 220 to the compact motor 310 is greater than a reference value C or when the rotational angle of the compact motor 310 is greater than a reference value D, the supply of power to the electric motor 114 and the compact motor 310 is stopped. Thus, the rotating shaft 120 of the electric motor 114 is restricted, and simultaneously, the reverse rotation of the push rod 116 on the same axle with the rotating shaft 120 is restricted, thereby performing the operation (braking) of the parking brake.

Releasing of Operation (Braking) of Parking Brake

Figure 9:
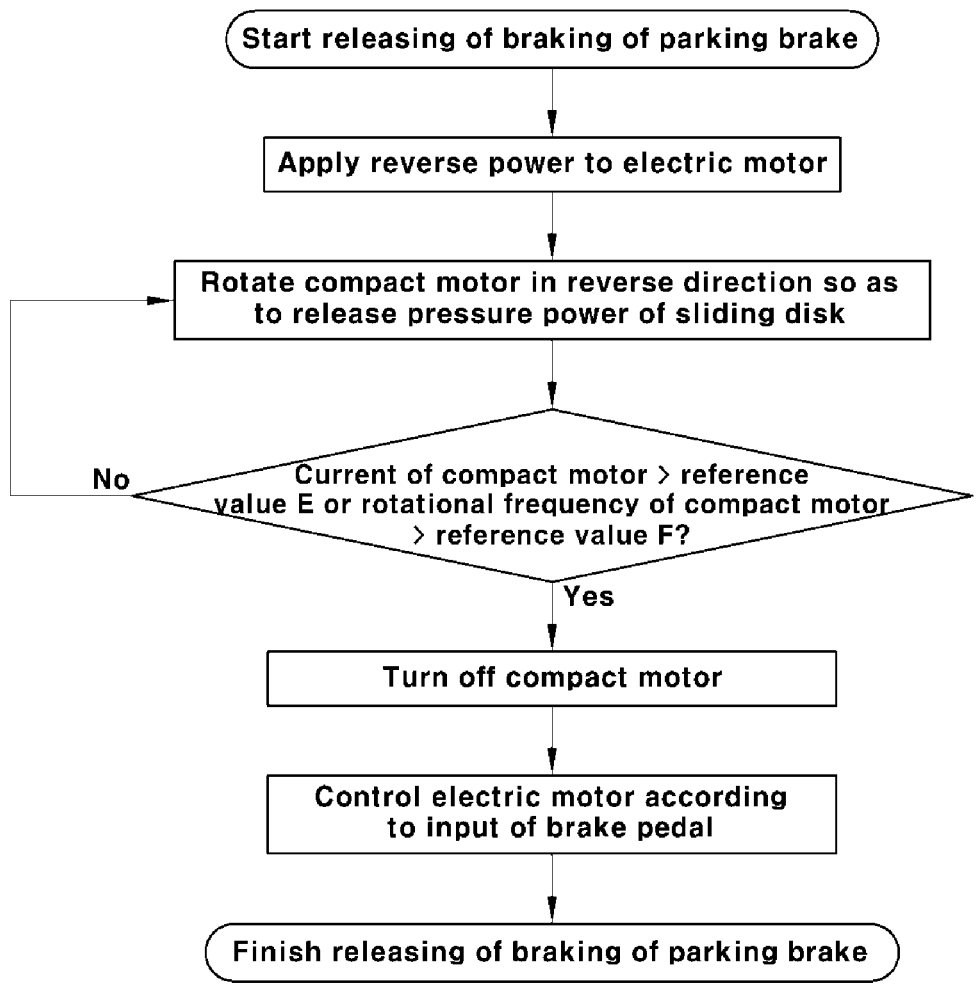

FIG. 4 is a sectional view illustrating a released state of the parking brake of the motor driven brake system according to the embodiment of the present invention. FIG. 9 is a flowchart illustrating an operation of the motor driven brake system. First, when the push rod 116 of the electric motor 114 performs a standing rotation in the reverse direction by applying power from the controller 220 to the electric motor 114 of the motor driven brake system, the pressure member 110 fastened to the push rod 116 performs a rectilinear movement toward a vehicle inner direction. This is because the push rod 116 is formed in the screw shape.

Simultaneously, when the push rod 312 of the compact motor 310 performs a standing rotation in the reverse direction by applying power from the controller 220 to the compact motor 310, the pressure member 308 fastened to the push rod 312 moves backward. This is because the push rod 312 is also formed in the screw shape.

Continuously, as the pressure member 308 moves backward, the state in which the sliding disk 302 and the friction pad 304 are adhered closely to each other is released, so that the rotating shaft 120 of the electric motor 114 becomes a rotatable state. Thus, the cylinder 108 integrally formed with the pressure member 110 of the motor driven brake system 100 moves backward, and the clamping force of the disk 106 due to the friction pad 104 is released, so that the braking of the parking brake is released.

Finally, when the current applied from the controller 220 to the compact motor 310 is greater than a reference value E or when the rotational angle of the compact motor 310 is less than a reference value F, the supply of power to the compact motor 310 is stopped.

Meanwhile, since the restriction of the rotating shaft 120 of the electric motor 114 is released during driving of the vehicle, the controller 220 controls the driving of the electric motor 114 according to the input of a brake pedal, so that the braking of the motor driven brake system can be smoothly performed. Further, since it is unnecessary to supply power to the compact motor of the parking brake while driving, the braking of the motor driven brake system is not released, so that it is possible to easily prevent the occurrence of a spin of the vehicle.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A motor driven brake system including an electric motor for providing braking power, a push rod embodied as a shaft in the outer direction of the electric motor, a rotating shaft embodied as a shaft in the inner direction of the electric motor, and a parking brake housing mounted within the housing where an electric motor or electric motor with a reduction gear is mounted, the system comprising sliding disks and friction pads, alternately mounted between the outside diameter of the rotating shaft and the inside diameter of the parking brake housing that restrict or release the rotation of the rotating shaft;

a pressure member disposed adjacent to the outermost sliding disk to press against the sliding disks and the friction pads, and having a screw aperture formed in an outer surface thereof;

a compact motor mounted to an outside inner wall surface of the parking brake housing and operated upon receiving power supplied only during application of the braking of a parking brake and release of the parking brake;

a screw-shaped push rod, as a driving shaft of the compact motor, inserted into the screw aperture of the pressure member so as to perform a standing rotation for the purpose of the forward-and-backward movement of the pressure member; and a controller applying power to the electric motor and compact motor, wherein the push rod and the rotating shaft are simultaneously rotated by operating the electric motor, and wherein the compact motor is operated by the controller when a clamping force applied to a disk is greater than a first reference value or when a rotational angle of the electric motor is greater than a second reference value.

2. The system of claim 1, wherein a guide member guiding a rectilinear movement of the pressure member while surrounding the outside diameter surface of the pressure member is mounted to the inside diameter surface of the parking brake housing.

3. The system of claim 1, wherein a fixing disk providing bearing power when the sliding disks and the friction pads are pressed is mounted between the inner surface of the electric motor and the innermost friction pad.

4. The system of claim 1, wherein a first projection is formed on the inside diameter surface of the parking brake housing, and a first recessed groove having the first projection inserted and fastened thereinto is formed in the outside diameter surface of the friction pad.

5. The system of claim 1, wherein a second projection is formed on the inside diameter surface of the sliding disk, and a second recessed groove having the second projection inserted and fastened thereinto is formed in the outside diameter surface of the rotating shaft.

6. The system of claim 2, wherein a third projection is formed on the inside diameter surface of the guide member, and a third recessed groove having the third projection inserted and fastened thereinto is formed in the outside diameter surface of the pressure member.

7. A method controlling a motor driven brake system, the method comprising:
   rotating a push rod embodied as a shaft in an outer direction of an electric motor and a rotating shaft embodied as a shaft in an inner direction of the electric motor by operating the electric motor at the same time, in response to receiving a signal from a controller to operate the motor driven brake system;
   determining, by the controller, whether a clamping force applied to a disk is greater than a first reference value or whether a rotational angle of the electric motor is greater than a second reference value;
   in response to determining that the clamping force is greater than the first value or that the rotational angle of the electric motor is greater than the second reference value, rotating a compact motor to press against a sliding disk;
   determining, by the controller, whether a current of the compact motor is greater than a third reference value or whether a rotational angle of the compact motor is greater than a fourth reference value; and
   in response to determining that the current is greater than the third value or that the rotational angle of the compact motor is greater than the fourth reference value, turning off the electric motor and the compact motor.

8. The method of claim 7, wherein the compact motor and the electric motor are turned off simultaneously.

9. The method of claim 7, wherein the electric motor is first turned off and then the compact motor is turned off.

10. A non-transitory computer readable medium containing program instructions executed by a controller, the computer readable medium comprising:
   program instructions that rotate a push rod embodied as a shaft in an outer direction of an electric motor and a rotating shaft embodied as a shaft in an inner direction of the electric motor by operating the electric motor at the same time, in response to receiving a signal from a controller to operate the motor driven brake system;
   program instructions that determine whether a clamping force applied to a disk is greater than a first reference value or whether a rotational angle of the electric motor is greater than a second reference value;
   program instructions that rotate a compact motor to press against a sliding disk in response to determining that the clamping force is greater than the first value or that the rotational angle of the electric motor is greater than the second reference value;
   program instructions that determine whether a current of the compact motor is greater than a third reference value or whether a rotational angle of the compact motor is greater than a fourth reference value; and
   program instructions that turn off the electric motor and the compact motor in response to determining that the current is greater than the third value or that the rotational angle of the compact motor is greater than the fourth reference value.

11. The non-transitory computer readable of claim 10, wherein the compact motor and the electric motor are turned off simultaneously.

12. The non-transitory computer readable of claim 10, wherein the electric motor is first turned off and then the compact motor is turned off.

* * * * *